US009753576B2

(12) United States Patent
Kim et al.

(10) Patent No.: US 9,753,576 B2
(45) Date of Patent: *Sep. 5, 2017

(54) TOUCH SCREEN PANEL

(71) Applicant: Samsung Display Co., Ltd., Yongin-si, Gyeonggi-do (KR)

(72) Inventors: Do-Youb Kim, Yongin-si (KR); Won-Kyu Kwak, Yongin-si (KR); Brent Jang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/299,297

(22) Filed: Oct. 20, 2016

(65) Prior Publication Data
US 2017/0038902 A1 Feb. 9, 2017

Related U.S. Application Data

(63) Continuation of application No. 12/949,392, filed on Nov. 18, 2010, now Pat. No. 9,477,351.

(30) Foreign Application Priority Data

Mar. 23, 2010 (KR) .................. 10-2010-0025660

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01); *G06F 2203/04103* (2013.01); *G06F 2203/04111* (2013.01)

(58) Field of Classification Search
CPC ...................................... G06F 3/041
See application file for complete search history.

(56) References Cited

U.S. PATENT DOCUMENTS 5,374,787 A 12/1994 Miller et al.
5,648,642 A 7/1997 Miller et al.
(Continued)

FOREIGN PATENT DOCUMENTS

CN 101424817 A 5/2009
CN 101441347 A 5/2009
(Continued)

OTHER PUBLICATIONS

Chinese Office action dated Sep. 2, 2014 issued in corresponding Chinese Application No. 201110044088.3 filed Feb. 17, 2011, (6 pages).

(Continued)

*Primary Examiner* — Alexander Eisen
*Assistant Examiner* — Cory Almeida
(74) *Attorney, Agent, or Firm* — Lewis Roca Rothgerber Christie LLP

(57) ABSTRACT

A touch screen panel includes: a flat panel display including an upper substrate, a lower substrate, and pixels arranged on a display region of the lower substrate in a stripe arrangement; first sensing cells arranged in a first direction on the upper substrate and second sensing cells arranged in a second direction on the upper substrate; first connection patterns electrically connecting adjacent ones of the first sensing cells to each other in the first direction, and second connection patterns electrically connecting adjacent ones of the second sensing cells to each other in the second direction, wherein at least one of the first connection patterns and the second connection patterns is inclined so that it partially overlaps with the pixels.

6 Claims, 6 Drawing Sheets

(56) References Cited

U.S. PATENT DOCUMENTS

| | | |
|---|---|---|
| 8,497,844 B2 | 7/2013 | Chen et al. |
| 8,599,150 B2 | 12/2013 | Philipp |
| 2005/0030048 A1 | 2/2005 | Bolender et al. |
| 2008/0150906 A1 | 6/2008 | Grivna |
| 2009/0135159 A1 | 5/2009 | Sun |
| 2009/0236151 A1 | 9/2009 | Yeh et al. |
| 2010/0007616 A1 | 1/2010 | Jang |
| 2010/0066650 A1 | 3/2010 | Lee et al. |
| 2010/0073310 A1* | 3/2010 | Liang ............. G06F 3/044 345/173 |
| 2010/0134436 A1 | 6/2010 | Jeong et al. |
| 2010/0182256 A1 | 7/2010 | Jeong et al. |
| 2010/0194696 A1 | 8/2010 | Chang et al. |
| 2011/0157086 A1 | 6/2011 | Ozeki et al. |
| 2011/0310037 A1 | 12/2011 | Moran et al. |

FOREIGN PATENT DOCUMENTS

| | | |
|---|---|---|
| JP | 5-189151 A | 7/1993 |
| JP | 2004-138912 | 5/2004 |
| JP | 2009-230735 | 10/2009 |
| JP | 2009-259063 | 11/2009 |
| JP | 2010-20315 A | 1/2010 |
| JP | 2010-033478 | 2/2010 |
| JP | 2011-517355 | 6/2011 |
| KR | 10-2008-0096352 | 10/2008 |
| KR | 10-0944519 B1 | 2/2010 |
| KR | 10-2010-0061993 | 6/2010 |
| WO | WO 2009/108758 A2 | 9/2009 |
| WO | WO 2010/029979 A1 | 3/2010 |

OTHER PUBLICATIONS

Japanese Office action dated Mar. 21, 2012, for corresponding Japanese Patent application 2010-129027, (2 pages).

Japanese Office action dated Jan. 8, 2013 issued in corresponding Japanese Patent Application No. 2010-129027, (1 page).

JPO Office action dated Aug. 20, 2013, for corresponding Japanese Patent application 2010-129027, (1 page).

KIPO Office Action dated May 25, 2011, for Korean priority Patent application 10-2010-0025660, (4 pages).

KIPO Office action dated Nov. 30, 2011 for priority application KR 10-2010-0025660, (1 page).

* cited by examiner

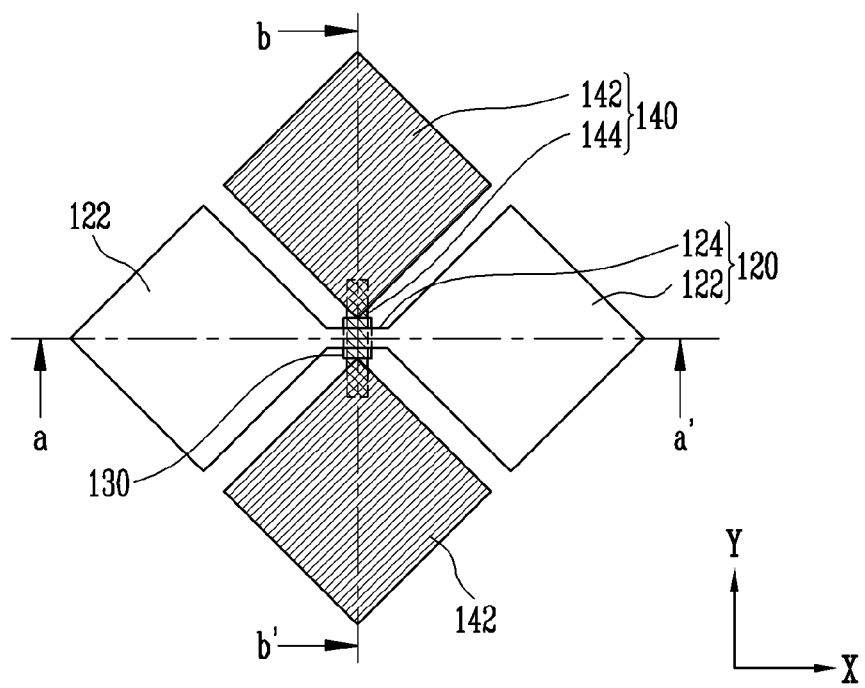
FIG. 1A
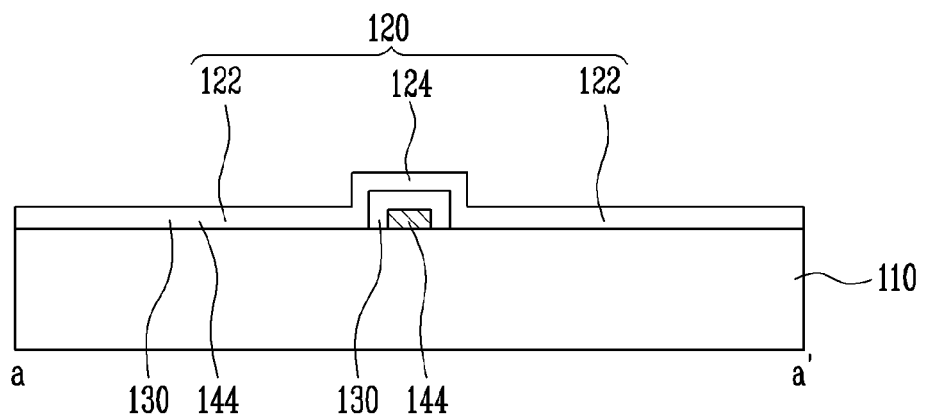
FIG. 1B
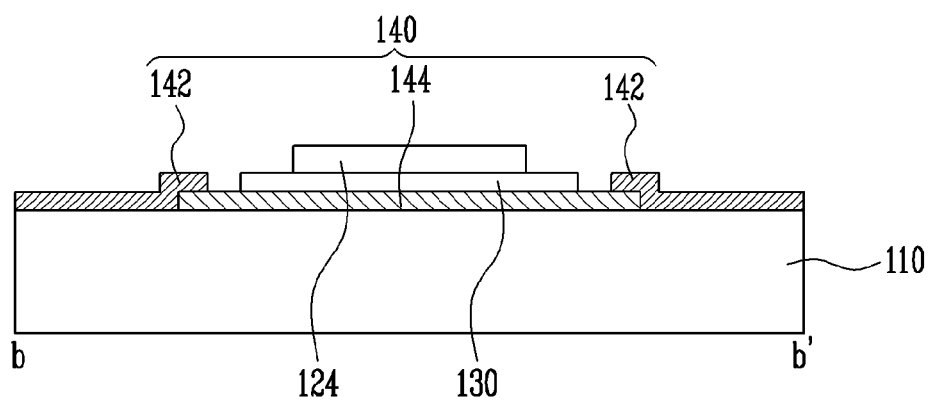

TOUCH SCREEN PANEL

CROSS-REFERENCE TO RELATED APPLICATION

This application is a continuation of U.S. patent application Ser. No. 12/949,392, filed Nov. 18, 2010, which claims priority to and the benefit of Korean Patent Application No. 10-2010-0025660, filed Mar. 23, 2010, the entire content of both of which is incorporated herein by reference.

BACKGROUND

1. Field

Aspects of embodiments according to the present invention relate to a touch screen panel.

2. Description of Related Art

A touch screen panel is an input device that allows a user to use a hand or an object to select contents displayed on a screen such as an image display device, etc.

To this end, the touch screen panel is provided on a front face of the image display device and generates electrical signals corresponding to positions directly contacted by a person's hand or an object. Therefore, the command contents selected at the contact position are received as the input signals. As the touch screen panel can replace a separate input device that is operated by being connected with the image display device such as a keyboard or a mouse, the application of the touch screen panel is increasing.

Types of the touch screen panel include a resistive type, a light sensing type, and a capacitive type, and so on.

Among those, the capacitive type touch screen panel generates electrical signals corresponding to contact positions by sensing the change in capacitance formed by a conductive sensing pattern, other sensing patterns around the conductive sensing pattern, or a ground electrode, etc. when a person's hand or object contacts the touch screen panel.

In order to clearly determine the contact position at the contact surface, the sensing pattern is configured to include first sensing patterns (X patterns) formed to be connected along a first direction and second sensing patterns (Y patterns) formed to be connected along a second direction.

In some related art, the first sensing patterns and second sensing patterns are located on different layers. In other words, as one example, the first sensing patterns are located on the lower layer, the second sensing patterns are located on the upper layer, and an insulating layer is interposed therebetween.

However, when the first sensing patterns and second sensing patterns are formed on different layers, a transparent conductive material (for example, ITO) used as the sensing patterns has large surface resistance. Accordingly, in order to reduce the surface resistance, a width of a connection part connecting the sensing patterns located on the same layer is implemented to be wide. However, an overlapping area of connection parts respectively located on the upper and lower layers becomes large, and the parasitic capacitance becomes large accordingly, such that the sensitivity of the sensing patterns is deteriorated.

SUMMARY

Aspects of embodiments according to the present invention are directed toward a touch screen panel where first sensing cells arranged in a first direction and second sensing cells arranged in a second direction are formed on the same layer, and first connection patterns connecting the first sensing cells to each other and/or second connection patterns connecting the second sensing cells to each other are made of a same material as a metal pattern formed at the periphery of the touch screen panel to reduce static electricity vulnerability of the connection patterns.

Further, the embodiments provide a touch screen panel, wherein the connection patterns formed on the touch screen panel are formed to be inclined at an angle (e.g., a predetermined angle) in order to prevent them from completely overlapping with pixels arranged on a display region of the flat display panel in a stripe arrangement, thereby improving visibility, in forming the touch screen panel on the upper substrate forming the display panel of the flat panel display.

According to one embodiment of the present invention, there is provided a touch screen panel including: a flat panel display including an upper substrate, a lower substrate, and pixels arranged on a display region of the lower substrate in a stripe arrangement; first sensing cells arranged in a first direction on the upper substrate and second sensing cells arranged in a second direction on the upper substrate; first connection patterns electrically connecting adjacent ones of the first sensing cells to each other in the first direction and second connection patterns electrically connecting adjacent ones of the second sensing cells to each other in the second direction, wherein at least one of the first connection patterns and the second connection patterns are inclined so that they partially overlap with the pixels.

The first connection patterns and/or the second connection patterns in the inclined form may be made of a low resistance opaque metal, and the first and second sensing cells may be on a display region of the upper substrate that overlaps with the display region of the lower substrate.

According to another embodiment of the present invention, there is provided a touch screen panel including: first connection patterns extending in a first direction on a transparent substrate; second connection patterns extending in a second direction on the transparent substrate and being spaced from the first connection patterns; first sensing cells arranged in the first direction, adjacent ones of the first sensing cells being electrically coupled to each other by a corresponding one of the first connection patterns in the first direction; and second sensing cells arranged in the second direction, adjacent ones of the second sensing cells being electrically coupled to each other by a corresponding one of the second connection patterns in the second direction.

One of the second connection patterns may partially overlap a corresponding one of the first sensing cells adjacent to two of the second sensing cells that are coupled to the one of the second connection patterns, and may further including an insulating layer between the one of the second connection patterns and the corresponding one of the first sensing cells.

The insulating layer may be formed in a plurality of island forms that are spaced from each other and may include an inorganic insulating layer of a transparent material selected from the group consisting of silicon oxide ($SiO_2$) and silicon nitride (SiNx).

The touch screen panel may further include a plurality of metal patterns located at a periphery (e.g., edge) of a display region of the upper substrate on which the first and second sensing cells are located, the metal patterns electrically coupling the first and second sensing cells column-by-column or row-by-row.

The first and second connection patterns and the metal patterns may be on a same layer and have a resistance value lower than that of a material forming the first and second sensing cells.

The second sensing cells may be alternately arranged with the first sensing cells so that they do not overlap with the first sensing cells.

Adjacent ones of the second sensing cells may be electrically coupled to each other by at least one of the second connection patterns, and the first and second connection patterns may be formed in a rectangular bar form.

According to exemplary embodiments of the present invention, each of the first and second connection patterns coupling the adjacent first or second sensing cells to each other is made of the same low resistance metal material as the metal pattern formed at the periphery of the touch screen panel, and each connection pattern is arranged not to overlap with each other to reduce the vulnerability of static electricity of the connection patterns, thereby making it possible to overcome an electrostatic discharge (ESD) problem.

Further, in forming the touch screen panel on the upper substrate forming the display panel of the flat panel display, the connection patterns formed on the touch screen panel are formed to be inclined at an angle (e.g., a predetermined angle) in order to prevent them from completely overlapping with the pixels arranged on the display region of the flat display panel in a stripe arrangement such that the interruption of the light emitting region of the pixels is minimized or reduced, thereby improving the visibility.

BRIEF DESCRIPTION OF THE DRAWINGS

The accompanying drawings, together with the specification, illustrate exemplary embodiments of the present invention, and, together with the description, serve to explain the principles of the present invention.

FIG. 1A is a plan view showing an arrangement of sensing patterns formed on a touch screen panel according to a first exemplary embodiment of the present invention;

FIG. 1B is a cross-sectional view taken along lines a-a' and b-b' of FIG. 1A;

DETAILED DESCRIPTION

Figure 2A:
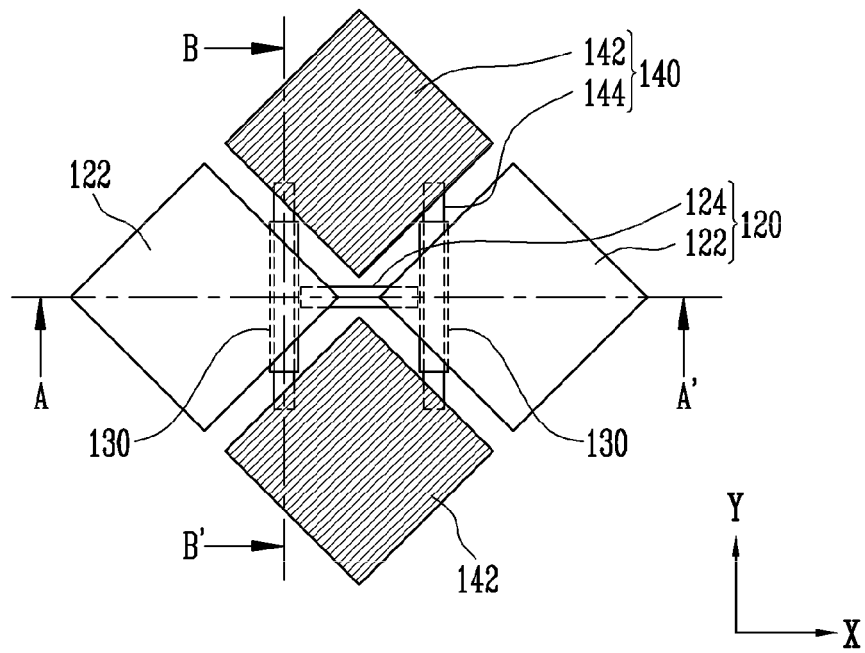
FIG. 2A is a plan view showing an arrangement of sensing patterns formed on a touch screen panel according to a second exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it may be directly on the another element or be indirectly on the another element with one or more intervening elements interposed therebetween. Also, when an element is referred to as being "connected to" or "coupled to" another element, it can be directly connected to the another element or be indirectly connected to the another element with one or more intervening elements interposed therebetween. Hereinafter, like reference numerals refer to like elements.

Hereinafter, embodiments of the present invention will be described in detail with reference to the accompanying drawings.

FIG. 1A is a plan view showing an arrangement of sensing patterns formed on a touch screen panel according to a first exemplary embodiment of the present invention, and FIG. 1B is a cross-sectional view taken along lines A-A' and B-B' of FIG. 1A.

Referring to FIGS. 1A and 1B, sensing patterns include first and second sensing patterns 120 and 140 that are alternately arranged. The second sensing patterns 140 are connected to each other in one column unit having the same X coordinate, and the first sensing patterns 120 are connected to each other in one row unit having the same Y coordinate.

Here, the first sensing patterns 120 are configured to include first sensing cells 122 arranged in one row having the same Y coordinate along a first direction (row direction) and a first connection pattern 124 that connects the adjacent first sensing cells 122 to each other. The second sensing patterns 140 are configured to include second sensing cells 142 arranged in one column having the same X coordinate along a second direction (column direction) and a second connection pattern 144 that connects the adjacent second sensing cells 142 to each other.

Here, the first sensing cells 122 are electrically connected to each other through the first connection pattern 124 that are made of a transparent conductive material on the same layer and are made of the same material as the first sensing cells 122 on the same layer.

However, the second connection pattern 144 that electrically connects the second sensing cells 142 to each other may not be formed on the same layer as the first and second sensing cells 122 and 142 in order to avoid short with the first connection pattern 124.

In the first embodiment of the present invention, the second connection pattern 144 is below the first connection pattern 124, and an insulating layer 130 is formed between the first and second connection patterns 124 and 144 in order to prevent the short therebetween.

Here, the insulating layer 130 may be formed in the crossing region of the first and second connection patterns 124 and 144 as islands.

Further, the connection pattern 144 is made of low resistance metal. For example, the connection pattern 144 may be formed at an end of the display region in which the first and second sensing cells 122 and 142 are formed and may be made of the same material as a metal pattern for supplying the signals sensed by the sensing cells to a driving circuit side.

According to the structure of the embodiment of FIG. 1, the second connection pattern 144 is made of the low resistance metal material to minimize or reduce the width of the connection pattern, thereby making it possible to reduce the effect of the parasitic capacitance generated in the crossing region of the first and second connection patterns 124 and 144.

However, even in this case, the connection pattern 124 is still made of a transparent conductive material having a high resistance value. Since the area of the connection pattern 124 overlapping the crossing region is reduced and since the connection pattern 124 is located above the insulating layer, the connection pattern 124 is vulnerable to static electricity applied from the outside.

Therefore, a structure according to another embodiment of the present invention is derived to improve the above-mentioned structure. The connection pattern that connects the first and second sensing cells to each other is made of the same metal material (e.g., a low resistance material) as the metal pattern formed at the periphery of the touch screen panel, and each connection pattern is arranged not to cross with each other to reduce the vulnerability of the connection pattern to static electricity.

Figure 2B:
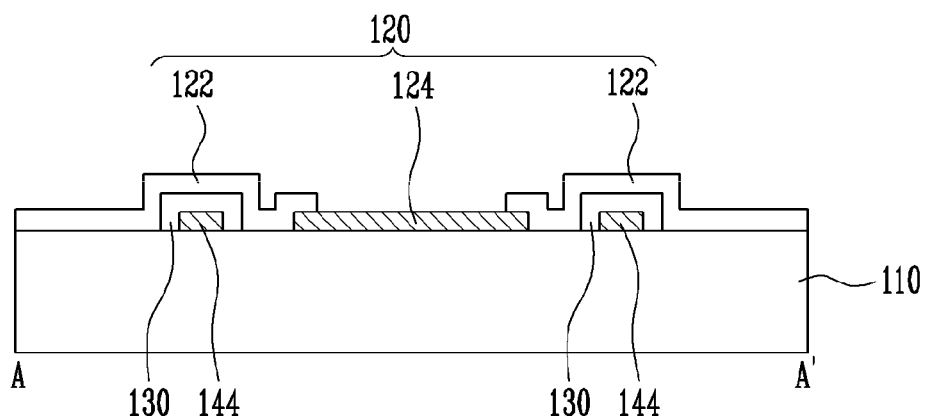
FIG. 2B is a cross-sectional view taken along lines A-A' and B-B' of FIG. 2A.

FIG. 2A is a plan view showing an arrangement of sensing patterns formed on a touch screen panel according to a second exemplary embodiment of the present invention, and FIG. 2B is a cross-sectional view taken along lines A-A' and B-B' of FIG. 2A.

Referring to FIGS. 2A and 2B, sensing patterns according to a second embodiment of the present invention include the first and second sensing patterns 120 and 140 that are alternately arranged. The second sensing patterns 140 are connected to each other in one column unit having the same X coordinate, and the first sensing patterns 120 are connected to each other in one row unit having the same Y coordinate.

Here, the first sensing patterns 120 are configured to include first sensing cells 122 arranged in one row having the same Y coordinate along a first direction (row direction) and a first connection pattern 124 that connects the adjacent first sensing cells 122 to each other, and the second sensing patterns 140 are configured to include second sensing cells 142 arranged in one column having the same X coordinate along a second direction (column direction) and a second connection pattern 144 that connects the adjacent second sensing cells 142 to each other.

Here, in the second embodiment of the present invention, the first sensing cells 122 and the second sensing cells 142 are formed on the same layer, and the first and second sensing cells 122 and 142 may be made of a transparent material to implement the operation of the touch screen panel. For example, the first and second sensing cells 122 and 142 may be made of a transparent conductive material, for example, indium tin oxide (hereinafter, ITO).

Further, in order for the first sensing cells 122 and the second sensing cells 142 to serve as sensing electrodes, the first sensing cells 122 arranged in the first direction are electrically connected to each other, and the second sensing cells 142 arranged in the second direction are electrically connected to each other.

Here, the first sensing cells 122 are electrically connected to each other by the first connection pattern 124, and the second sensing cells 142 are electrically connected to each other by the second connection pattern 134.

Here, since the first sensing cells 122 and the second sensing cells 142 are formed on the same layer, the first connection pattern 124 and the second connection pattern 144 may be formed on the same layer as the first and second sensing cells 122 and 142 to avoid the short.

In FIGS. 2A and 2B, the first and second connection patterns 124 and 144 are formed below the first and second sensing cells 122 and 142.

Referring to FIGS. 2A and 2B, the first and second connection patterns 124 and 144 are first formed on a transparent substrate 110, and each of the first and second sensing cells 122 and 142 are formed to contact an end of the first and second connection patterns 124 and 144, respectively.

In other words, the adjacent first sensing cells 122 are electrically connected to each other by the first connection pattern 124, and the adjacent second sensing cells 142 are electrically connected to each other by the second connection pattern 144.

Further, since the first and second connection patterns 124 and 144 are formed on the same layer, they are formed to be spaced apart by a suitable interval in order to avoid the short therebetween.

Figure 2B:
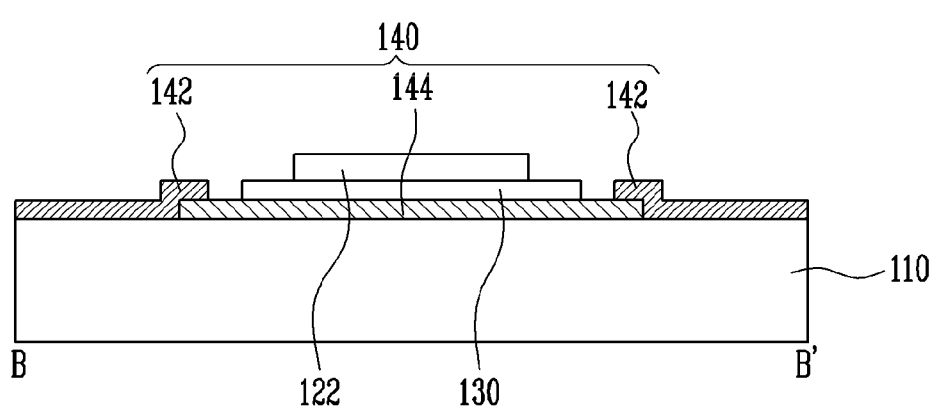

In the case of the embodiment shown in FIG. 2, the second connection pattern 144 overlaps with a portion of the first sensing cell 122, and the insulating layer 130 is formed between the second connection pattern 144 and the portion of the first sensing cell 122 in order to prevent the second connection pattern 144 and the first sensing cell 122 from electrically connecting to each other.

Here, the insulating layer 130 may be an inorganic insulating layer of a transparent material such as silicon oxide ($SiO_2$) or silicon nitride ($SiNx$).

As shown in FIG. 2A, the first connection pattern 124 extends in a first direction (row direction) and electrically connects the first sensing cells 122, and the second connection pattern 144 is arranged to be spaced from the first connection pattern 124 and extends in a second direction (column direction) and electrically connects the adjacent second sensing cells 142 to each other.

In FIG. 2A, a pair of the second connection patterns 144 connect the adjacent second sensing cells 142 to each other, but the present invention is not limited thereto. In other embodiments, a single second connection pattern 144 may be used.

In addition, the first and second connection patterns 124 and 144 may be formed in a rectangular bar shape as shown, but this is shown by way of example only, and therefore, the present invention is not limited thereto.

In one embodiment of the present embodiment, the first and second connection patterns 124 and 144 are made of a low resistance metal. For example, the first and second connection patterns 124 and 144 may be formed at an end of the display region on which the first and second sensing cells 122 and 142 are formed and are made of the same material as the metal pattern that supplies the signals sensed by the sensing cells to the driving circuit.

In this case, since the first and second connection patterns 124 and 144 are formed on the same layer as the metal pattern through the same process without requiring the additional masking process for forming the first and second connection patterns, the number of processes and manufacturing time can be reduced.

Further, the first and second connection patterns 124 and 144 connecting the sensing cells to each other are made of the low resistance metal, not the transparent conductive material such as the sensing cells, thereby making it possible to improve charge flow at the connection portions of the sensing cells, and thus improve the sensing sensitivity of the sensing cells.

Further, each of the connection patterns 124 and 144 is arranged not to cross with each other to reduce the vulnerability of the connection patterns to static electricity, thereby making it possible to overcome or reduce the electrostatic discharge (ESD) problem. As shown in FIG. 2A, in the case of the second connection pattern 144, the overlapping area occurs between the second connection pattern 144 and the first sensing cells 122 that are connected by the first connection patterns 124, thereby making it possible to prevent charges from concentrating and passing through a narrow space of the second connection pattern 144.

However, as described above, in the overlapping area between the second connection patterns 144 and the first sensing cells 122, the insulating layer 130 is formed in an island form in order to prevent the short between the second connection patterns 144 and the first sensing cells 122.

Figure 3A:
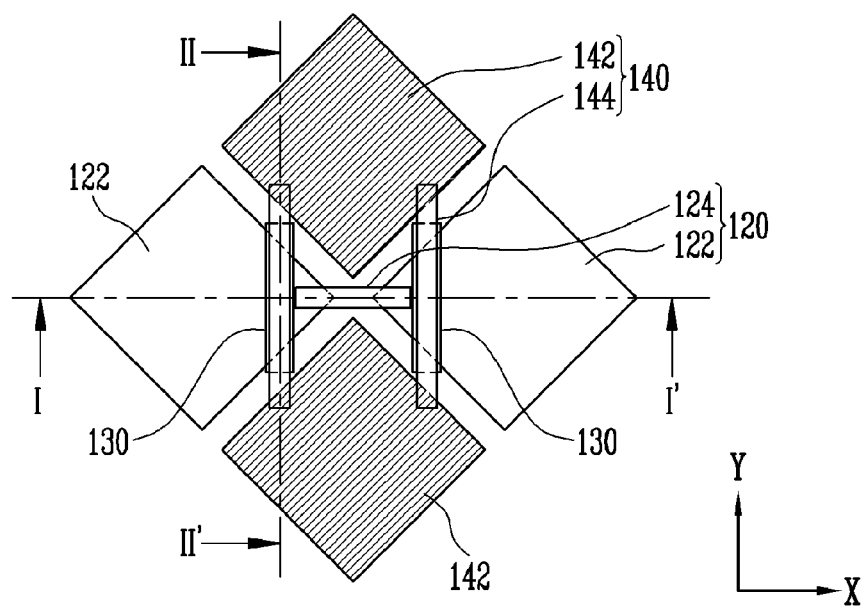
FIG. 3A is a plan view showing an arrangement of sensing patterns formed on a touch screen panel according to a third exemplary embodiment of the present invention.
Figure 3B:
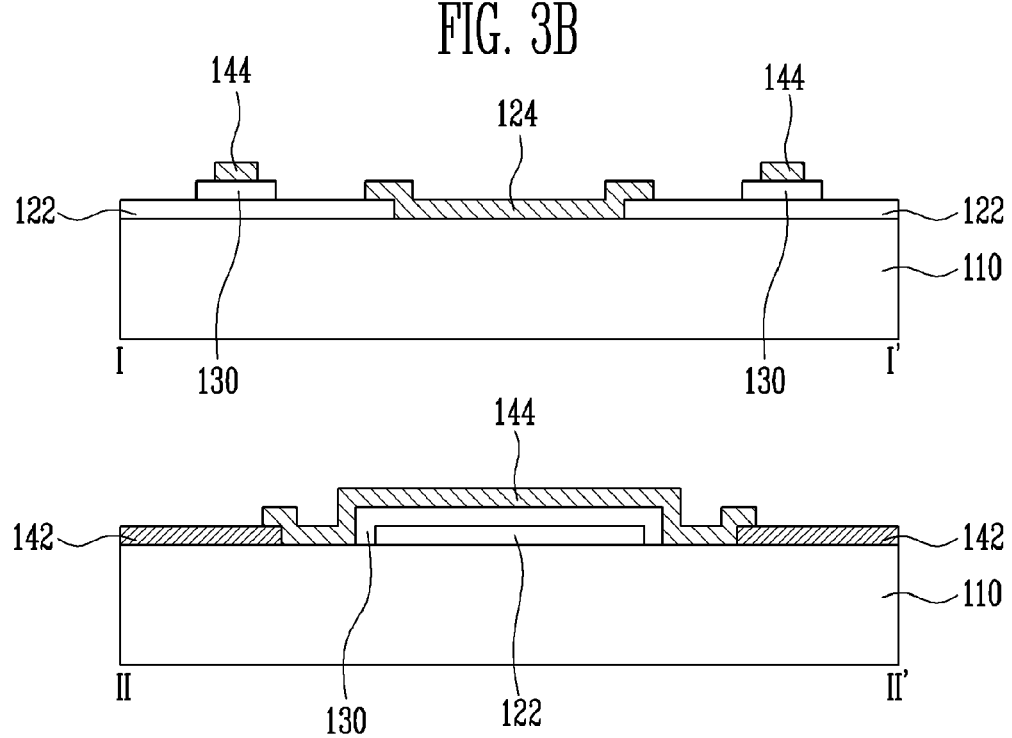
FIG. 3B is a cross-sectional view taken along lines I-I' and II-II' of FIG. 3A.

FIG. 3A is a plan view showing an arrangement of sensing patterns formed on a touch screen panel according to a third exemplary embodiment of the present invention, and FIG. 3B is a cross-sectional view taken along lines I-I' and II-II' of FIG. 3A.

The second embodiment of the present invention in reference to FIG. 2 describes the example where the first and second connection patterns 124 and 144 are formed on the lower layer, but the present invention is not limited thereto.

In other words, as shown in FIGS. 3A and 3B, the first and second connection patterns 124 and 144 may be implemented to be above the first and second sensing cells 122 and 142. In this case, the sensing cells 122 and 142 may be first formed on the transparent substrate 110, and the first and second connection patterns 124 and 144 may be formed thereon.

More specifically, with the third embodiment of the present invention, the first sensing cells 122 arranged in one row along the first direction whose Y coordinates are the same and the second sensing cells 142 arranged in one column along a second direction whose X coordinates are the same are formed on the transparent substrate 110.

Thereafter, the first connection pattern 124 contacting the ends of the first sensing cells 122 is formed so that the adjacent first sensing cells 122 are electrically connected to each other, and the second connection pattern 144 contacting the ends of the second sensing cells 142 is formed so that the adjacent second sensing cells 142 are electrically connected to each other.

However, even in this case, the second connection pattern 144 overlaps with a portion of the first sensing cell 122, and the insulating layer 130 is formed between the overlapping second connection pattern 144 and first sensing cell 122 in order to prevent the second connection pattern 144 and the first sensing cell 122 from electrically connecting to each other.

Here, the insulating layer 130 may be an inorganic insulating layer of a transparent material such as silicon oxide ($SiO_2$) or silicon nitride (SiNx).

Further, as shown, the second connection pattern 144 is arranged to be spaced from the first connection pattern 124 by a suitable interval in order to avoid the short with the first connection pattern 124.

In the third embodiment, although the sequence of each layer is changed, the detailed configuration and effect are substantially the same as the above-mentioned second embodiment, and therefore, the detailed description thereof will be omitted.

Figure 4:
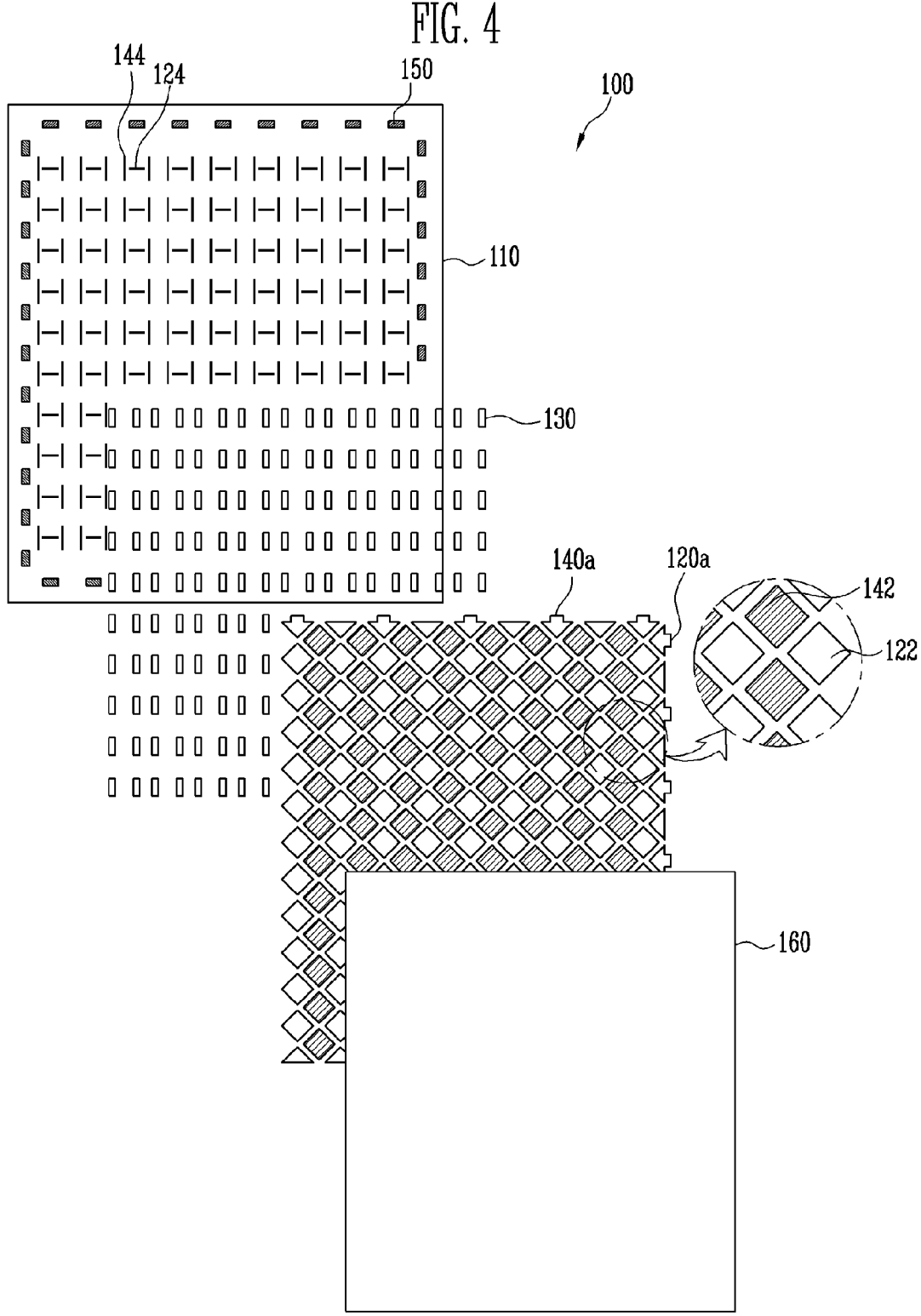
FIG. 4 is an exploded plan view of the touch screen panel according to the second embodiment of the present invention shown in FIGS. 2A and 2B.

FIG. 4 is an exploded plan view of the touch screen panel according to the second embodiment of the present invention shown in FIGS. 2A and 2B.

Referring to FIG. 4, the touch screen panel 100 according to an embodiment of the present invention includes a transparent substrate 110, a plurality of first connection patterns 124 extending on the transparent substrate 110 in the first direction, a plurality of second connection patterns 144 extending on the transparent substrate 110 in a second direction and spaced from the first connection patterns 124, and the first and second sensing cells 122 and 142 formed on the substrate 110 on which the first and second connection patterns 124 and 144 are arranged.

Here, the ends of the first sensing cells 122 are formed to contact the ends of the first connection patterns 124, and the first sensing cells 122 connected to each other by the first connection patterns 124 configure the first sensing pattern 120.

Similarly, the ends of the second sensing cells 142 are formed to contact the ends of the second connection patterns 144, and the second sensing cells 142 connected to each other by the second connection patterns 144 configure the second sensing pattern 140.

Here, the second connection pattern 144 overlaps with a portion of the first sensing cell 122, and the insulating layer 130 in the island form as shown is formed between the overlapping second connection pattern 144 and first sensing cell 122 in order to prevent the second connection pattern 144 and the first sensing cell 122 from electrically connecting to each other.

Here, the insulating layer 130 may be an inorganic insulating layer of a transparent material such as silicon oxide ($SiO_2$) or silicon nitride (SiNx).

In addition, it further includes a plurality of metal patterns 150 that are located at a periphery (e.g., edge) of the display area where the first and second sensing patterns 120 and 140 are formed and electrically connect the sensing patterns in one column or row unit to position detection lines.

In other words, the metal patterns 150 are located at a non-display region that is outside of a region where the first and second sensing patterns 120 and 140 are formed, and are positioned to correspond to the pads 120a and 140a of the first and second sensing patterns 120 and 140.

Each of the metal patterns 150 connects the sensing patterns 120 and 140 in one column or row unit to the position detection line (not shown) to supply the contact position detection signal to the driving circuit (not shown), etc.

The plurality of metal patterns 150 may be formed through the same process as the first and second connection patterns 124 and 144. Therefore, the metal patterns 150 may be formed on the transparent substrate 110 and are made of low resistance material.

Further, the first sensing cells 122 are formed on the transparent substrate 110, on which the first and second connection patterns 124 and 144 are located, to be connected along the first direction. For example, the first sensing cells 122 may be formed closely in regular patterns such as a diamond pattern.

The shape of the first sensing cells 122 is not limited to the diamond shape and may be implemented in various shapes where the first sensing cells 122 may be located closely to each other.

The first sensing patterns 120 include a plurality of pads 120a to electrically connect the first sensing patterns 120 to the metal patterns in row units. The pads 120a of the first sensing patterns 120 may be alternately provided at the left and right sides in columns or may be provided all at the left and/or right sides.

Further, the second sensing cells 142 are formed on the transparent substrate 110, on which the first and second connection patterns 124 and 144 are arranged, along the second direction and are alternately arranged with the first sensing cells 122 not to overlap with the first sensing cells 122.

In this case, the second sensing cells 142 may be formed closely in the diamond pattern, similar to the first sensing cells 122.

The second sensing patterns 140 include a plurality of pads 140a to electrically connect the second sensing patterns 140 to the metal patterns 150 in row units. The pads 140a of the second sensing patterns 140 may be alternately provided at the upper and lower side in rows or may be provided at both the upper and lower sides.

Here, the first sensing cells 122 do not overlap with the second sensing cells 142. In other words, the first sensing cells 122 and the second sensing cells 142 are alternately arranged to space from each other.

As described above, in one embodiment of the present invention, the first and second connection patterns 124 and 144 are formed on the lowermost layer of the touch screen panel 100 and do not overlap with each other, thereby making it possible to reduce the vulnerability against the static electricity input from the outside and to secure the adhering stability with the insulating film.

In addition, in one embodiment of the present invention, the transparent substrate 110 may be the upper substrate of the display panel (not shown) of a flat panel display. Therefore, the first and second sensing cells 122 and 142 may be made of transparent materials that can transmit light emitted to the touch screen panel 100 from the display panel located below the touch screen panel 100.

For example, the first and second sensing cells 122 and 142 may be made of a transparent electrode material such as indium-tin-oxide (hereinafter, ITO).

Further, a protective layer 160 may be formed on the first and second sensing cells 122 and 142 to cover them. For example, the protective layer 160 may be formed of a transparent insulating material having a thickness of 400 Å to 1000 Å on the first and second sensing cells 122 and 142. However, the protective layer 160 may be omitted according to the product design.

The third embodiment shown in FIG. 3 has the same configuration as the second embodiment except that the first and second connection patterns 124 and 144 are formed above the first and second sensing cells 122 and 142, and therefore, the exploded plan view and detailed description thereof will be omitted.

Figure 5A:
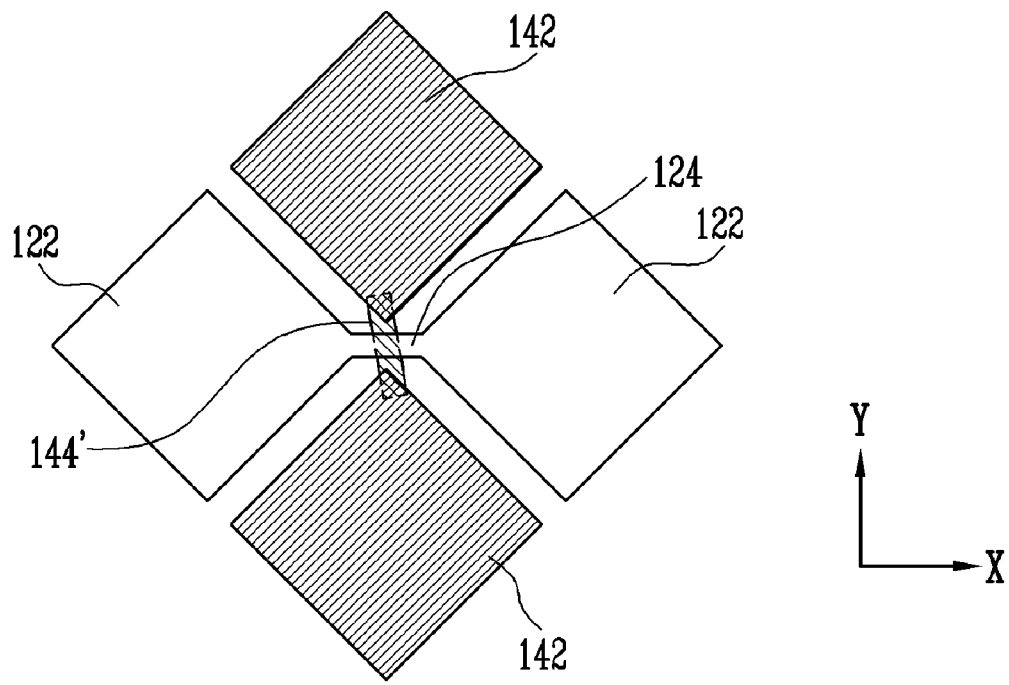
FIGS. 5A, 5B, and 5C are plan views showing an arrangement of sensing patterns formed on a touch screen panel according to a fourth exemplary embodiment of the present invention.
Figure 5B:
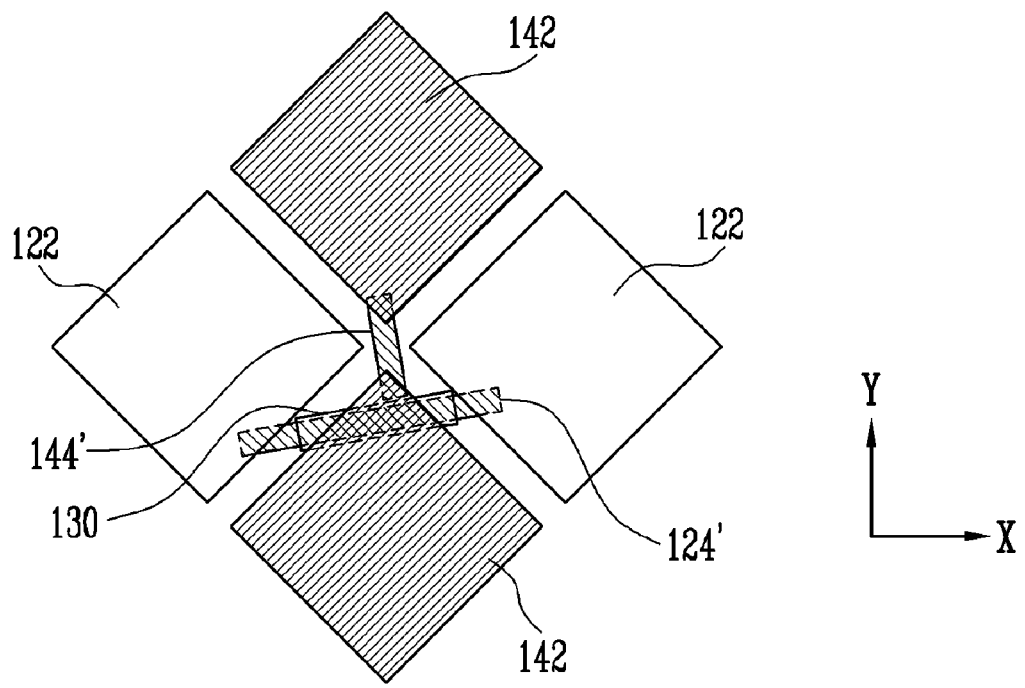
Figure 5C:
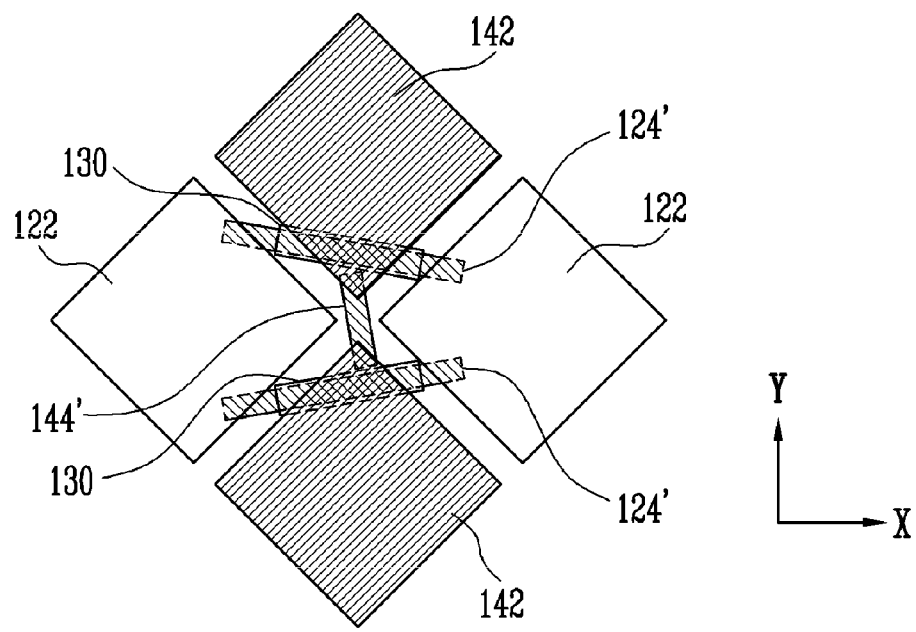
Figure 6:
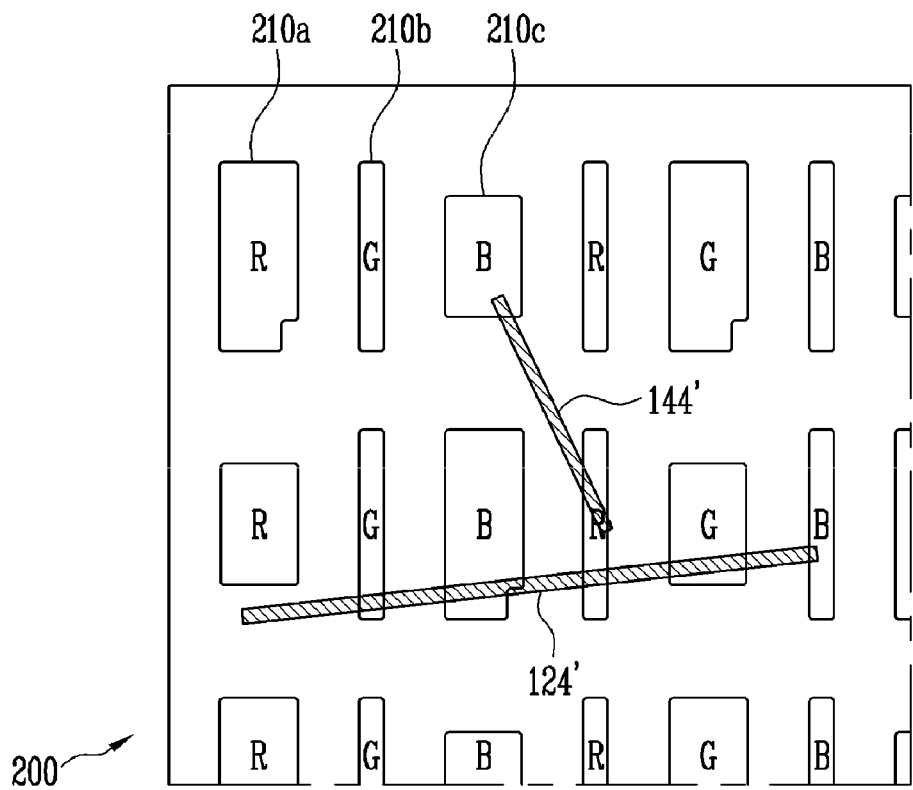
FIG. 6 is a plan view showing first and second connection patterns according to the embodiment of FIG. 5B and an arrangement state of pixels formed on a display panel.

FIGS. 5A to 5C are plan views showing an arrangement of the sensing patterns formed on the touch screen panel according to the fourth embodiment of the present invention, and FIG. 6 is a plan view showing an arrangement state of the first and second connection patterns and pixels formed on the display panel.

However, when the fourth embodiment of the present invention is compared with the first to third embodiments, in forming the touch screen panel on the upper substrate forming the display panel of the flat panel display, there is the difference between the fourth embodiment and the first to third embodiments in that the first and/or second connection patterns 124' and 144' formed on the touch screen panel are formed to be inclined at an angle (e.g., a predetermined angle) so that they do not completely overlap with pixels 210a, 210b, and 210c (shown in FIG. 6) arranged in a stripe arrangement on the display region 200 of the lower substrate forming the display panel. Here, the same reference numerals refer to the same components as the first to third embodiments, and the detailed description thereof will be omitted.

Here, the first and second sensing cells 122 and 142 and the first and second connection patterns 124' and 144' are formed in the display region corresponding to the display region on the lower substrate.

However, for convenience of description, the embodiment shown in FIGS. 5B and 5C describes the example that the first and second connection patterns 124' and 144' are formed below the first and second sensing cells 122 and 142, but the embodiment of the present invention is not limited thereto. In other words, the first and second connection patterns 124' and 144' may be formed above the first and second sensing cells 122 and 142.

As described above, the transparent substrate 110 of the touch screen panel according to an embodiment of the present invention may be implemented as the upper substrate of the display panel (not shown) configuring the flat panel display device.

Referring first to FIG. 5A, with reference to the structure described through FIG. 1, the second connection pattern 144' made of the low resistance metal is implemented in a form inclined at an angle (e.g., a predetermined angle), not in a horizontal and vertical direction.

In addition, referring to FIGS. 5B, 5C and FIG. 6 with reference to the structure described through FIGS. 2 and 3, the first sensing patterns 120 are configured to include the first sensing cells 122 arranged in one row having the same Y coordinate along the first direction (row direction) and a first connection pattern 124' that connects the first sensing cells 122 to each other, and the second sensing patterns 140 are configured to include the second sensing cells 142 arranged in one column having the same X coordinate along a second direction (column direction) and a second connection pattern 144' that connects the adjacent second sensing cells 142 to each other, wherein the first and second connection patterns 124' and 144' are implemented in a form inclined at an angle (e.g., a predetermined angle), not horizontal and vertical directions.

Here, a single one of the first connection pattern 124' or the second connection pattern 144' may be used to connect two adjacent sensing cells, or, as shown in FIG. 5C, a pair of the first connection patterns 124' may be used to connect two adjacent sensing cells.

The embodiments shown in FIGS. 5A to 5C may prevent the first and second connection patterns 124' and 144' formed on the touch screen panel from completely overlapping with the pixels 210a, 210b, and 210c arranged in the stripe arrangement on the display region 200 of the display panel when the touch screen panel is formed on the upper substrate forming the display panel of the flat panel display.

In other words, as in the embodiments shown in FIGS. 1 to 3, when the first and/or second connection patterns are arranged horizontally or vertically, they may completely overlap with the pixels 210a, 210b, and 210c arranged in the stripe arrangement on the display region of the display panel.

The connection patterns made of the low resistance metal material have opaque characteristics, such that light emitted from the display panel is interrupted. When the connection patterns are arranged in the same horizontal direction or vertical direction as the pixels 210a, 210b, and 201c, some of them may completely overlap the pixels formed in the corresponding region, such that light emitted from the pixels overlapped with the connection patterns is interrupted by the connection patterns, and the overlapping region is expressed as a dark point.

In order to overcome the above problem, in the embodiment of the present invention as shown in FIGS. 5 and 6, the first and/or second connection patterns 124' and 144' are arranged to be inclined, such that the case where the connection patterns 124' and 144' completely overlap with the pixels 210a, 210b, and 210c formed in the corresponding region is minimized, thereby making it possible to overcome the problem of expressing the dark point as described above.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen unit comprising:
    first connection patterns arranged in a first direction on a transparent substrate;
    second connection patterns arranged in a second direction on the transparent substrate and being spaced from the first connection patterns wherein the first and second directions define a plane;
    first sensing cells arranged in the first direction, adjacent ones of the first sensing cells being electrically coupled to each other by a corresponding one of the first connection patterns in the first direction;
    second sensing cells arranged in the second direction, adjacent ones of the second sensing cells being electrically coupled to each other by a corresponding one of the second connection patterns in the second direction; and
    an insulating layer electrically isolating the first sensing cells from the second sensing cells,
    wherein each of the first sensing cells is electrically connected to each adjacent first sensing cell by at least two of the first connection patterns, and
    wherein the first connection patterns are in a single rectangular bar shape having an oblique angle with respect to the first or second direction.

2. The touch screen unit as claimed in claim 1, wherein one of the first connection patterns partially overlaps a corresponding one of the second sensing cells adjacent to two of the first sensing cells that are coupled to the one of the first connection patterns.

3. The touch screen unit as claimed in claim 2, wherein the insulating layer has a form of a plurality of islands that are spaced from each other.

4. The touch screen unit as claimed in claim 2, wherein the insulating layer comprises an inorganic insulating layer of a transparent material selected from the group consisting of silicon oxide ($SiO_2$) and silicon nitride ($SiN_x$).

5. The touch screen unit as claimed in claim 1, wherein the second connection patterns are in the rectangular bar shape.

6. The touch screen unit as claimed in claim 1, wherein the first and second sensing cells are made of indium-tin-oxide (ITO).

* * * * *